United States Patent [19]

Fukui et al.

[11] Patent Number: 5,341,893
[45] Date of Patent: Aug. 30, 1994

[54] FOUR WHEEL DRIVE WORKING VEHICLE HAVING TRANSMISSION CLUTCHES SEPARATELY OPERABLE FOR DRIVING RIGHT AND LEFT REAR WHEELS

[75] Inventors: Tetsu Fukui; Yoshimi Oota; Shigekazu Hasegawa, all of Sakai, Japan

[73] Assignee: Kubota Corporation, Osaka, Japan

[21] Appl. No.: 893,659

[22] Filed: Jun. 5, 1992

[30] Foreign Application Priority Data

Dec. 13, 1991 [JP]    Japan .................. 3-329389

[51] Int. Cl.⁵ ........................................ B60K 17/354
[52] U.S. Cl. ........................... 180/245; 180/248; 180/249; 74/650
[58] Field of Search ............. 180/244, 245, 246, 247, 180/248, 249, 250; 74/650; 475/231, 86, 238, 249

[56] References Cited

U.S. PATENT DOCUMENTS

| | | | |
|---|---|---|---|
| 4,723,622 | 2/1988 | Toshikuni et al. | 180/233 |
| 4,792,009 | 12/1988 | Iritani | 180/248 |
| 4,862,988 | 9/1989 | Umemoto | 180/246 |
| 4,921,065 | 5/1990 | Hamada et al. | 180/245 |
| 4,967,868 | 11/1990 | Schwarz et al. | 180/233 |
| 5,058,700 | 10/1991 | Shibahata | 180/245 |
| 5,119,900 | 6/1992 | Watanabe et al. | 180/245 |
| 5,161,636 | 11/1992 | Haupt et al. | 475/86 |

FOREIGN PATENT DOCUMENTS

| | | | |
|---|---|---|---|
| 3719821 | 12/1988 | Fed. Rep. of Germany | B62D 15/00 |
| 15-5682 | 2/1940 | Japan . | |
| 16-13209 | 2/1941 | Japan . | |
| 1293234 | 11/1989 | Japan . | |
| WO9101240 | 2/1991 | PCT Int'l Appl. | B62D 9/00 |

Primary Examiner—Margaret A. Focarino
Assistant Examiner—Anne Marie Boehler
Attorney, Agent, or Firm—Webb Ziesenheim Bruening Logsdon Orkin & Hanson

[57] ABSTRACT

A four wheel drive working vehicle having transmission clutches separately operable for driving right and left rear wheels. Power for driving right and left front wheels is transmitted thereto from a change speed device through a front differential, while power for driving the rear wheels is transmitted thereto from the change speed device through the transmission clutches, respectively. When the front wheels are steered from a straight running position beyond a predetermined angle in order to turn the vehicle, the transmission clutch corresponding to the rear wheel lying on the inside of the turn is disengaged while the transmission clutch corresponding to the outside rear wheel remains engaged. Consequently, the rear wheel lying on the inside of the turn and describing the smallest turning radius is placed in free rotation state. The working vehicle can change running directions and make small, sharp turns smoothly without a rear differential.

5 Claims, 4 Drawing Sheets

FOUR WHEEL DRIVE WORKING VEHICLE HAVING TRANSMISSION CLUTCHES SEPARATELY OPERABLE FOR DRIVING RIGHT AND LEFT REAR WHEELS

BACKGROUND OF THE INVENTION

1. Field of the Invention

This invention relates to a four wheel drive working vehicle having transmission clutches separately operable for driving right and left rear wheels.

2. Description of the Related Art

As one example of the four wheel drive working vehicle noted above, there is a riding type rice planting machine disclosed in Japanese Patent Publication Kokai No. 1-293234, for example. In this working vehicle, power outputted from a transmission is divided by a rear differential for separately driving right and left rear wheels through a pair of transmission clutches, usually called side clutches, corresponding to the respective rear wheels. This working vehicle further includes side brakes for acting on the respective rear wheels. Power outputted from the transmission for driving front wheels is also divided by a front differential for transmission to the right and left front wheels.

The rear differential is switchable between a locked state and an unlocked state to produce two turning modes suited to the two states. That is, when one of side brake pedals is depressed with the rear differential locked, the transmission clutch connected to the rear wheel braked by the corresponding side brake is disengaged. Consequently, the vehicle may be turned with one rear wheel stopped even if the rear differential is locked. When the rear differential is unlocked, interlocking between the side brake pedal and side clutch is broken. In this condition, the transmission clutch connected to the rear wheel braked by the corresponding side brake remains engaged, thereby allowing the vehicle to make a turn with power distributed to the right and left rear wheels. Thus, when the vehicle is driven straight or slightly turned on a normal working site, the rear differential is maintained in operative state. If the rear differential is locked when the vehicle makes a turn with a small radius of turning, the transmission clutch connected to the rear wheel braked by one of the side brakes and lying on the inside of the turn is disengaged. Although running performance of the vehicle is thereby improved, a complicated control structure is required for locking the rear differential and operating the clutches. This results in enlargement and high cost of the apparatus relating to such controls.

SUMMARY OF THE INVENTION

The object of the present invention is to provide a four wheel drive working vehicle with a turning system having a simple construction and yet realizing an excellent turning performance.

The above object is fulfilled, according to the present invention, by a four wheel drive working vehicle in which power for driving right and left front wheels is transmitted thereto from a change speed device through a front differential, while power for driving right and left rear wheels is transmitted thereto from the change speed device through transmission clutches, respectively. When the front wheels are steered from a straight running position beyond a predetermined angle, the transmission clutch corresponding to the rear wheel lying on the inside of the turn is disengaged.

In the above four wheel drive working vehicle, the transmission clutches for driving the rear wheels are set to a power transmitting state at a time of straight running of the vehicle. In this state, the vehicle runs straight by four wheel drive, with power transmitted to the right and left front wheels through the front differential and to the right and left rear wheels through the right and left transmission clutches.

When the front wheels are steered from the straight running position beyond the predetermined angle in order to turn the vehicle, the transmission clutch corresponding to the rear wheel lying on the inside of the turn is disengaged while the transmission clutch corresponding to the outside rear wheel remains engaged. Consequently, the rear wheel lying on the inside of the turn and describing the smallest turning radius is placed in free rotation state. This working vehicle can change running directions and make small, sharp turns smoothly without a rear differential.

The change speed device may include a front wheel speed changer for selectively producing a first mode to drive the front wheels and rear wheels at substantially the same speed, and a second mode to drive the front wheels faster than the rear wheels, and a front wheel speed control device for switching the front wheel speed changer from the first mode to the second mode when the front wheels are steered in excess of a second predetermined angle. This construction further promotes the vehicle's turning performance.

With a four wheel drive working vehicle having a conventional construction, for example, if the front wheels are driven approximately twice as fast as the rear wheels in the second mode, the vehicle may be able to turn with a smaller turning radius than when the front and rear wheels are driven at the same speed. However, because of the small turning radius, the rear wheel on the inside of the turn will scrape the ground. The working vehicle according to the present invention remedies this drawback by allowing free rotation of the rear wheel lying on the inside of the turn.

The following may be cited as an additional advantage of the present invention. When the vehicle makes a turn with the rear wheel lying on the inside of the turn placed in free rotation state by disengaging the corresponding clutch, only the outside rear wheel has drive. In this case, the driving speed produced by the single rear wheel may be regarded as half of the driving speed produced by the two rear wheels. Consequently, the same result is obtained as when the difference in driving speed between the front and rear wheels is increased. An excellent turning performance based on front wheel acceleration is fully attained without increasing the front wheel drive twofold or more.

Other features and advantages of the present invention will be apparent from the following description of the preferred embodiment taken with reference to the accompanying drawings.

DETAILED DESCRIPTION OF THE PREFERRED EMBODIMENT

An embodiment of the present invention will be described hereinafter with reference to the drawings.

Figure 1:
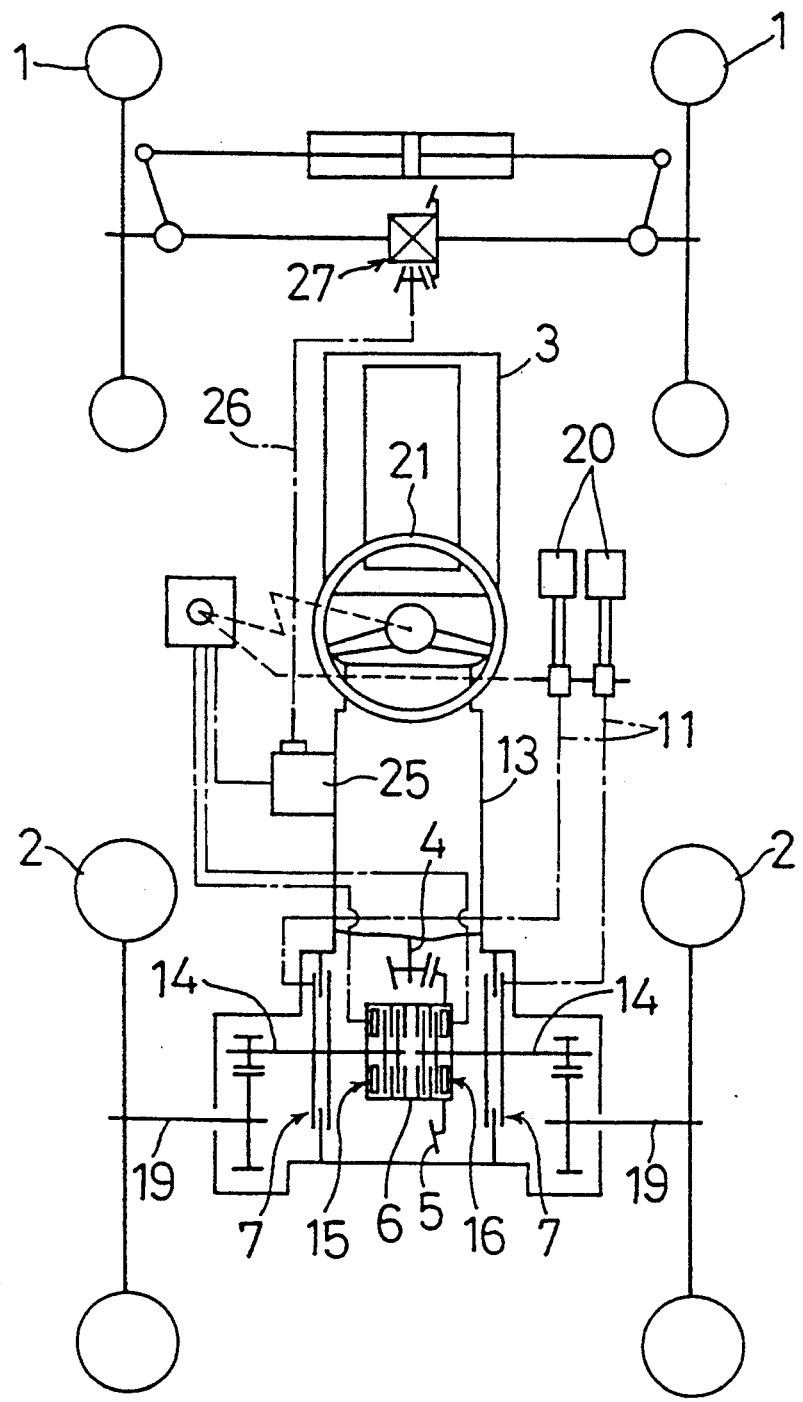
FIG. 1 is a schematic plan view of a four wheel drive working vehicle according to the present invention, showing a driveline for front wheels and one for rear wheels.

FIG. 1 schematically shows an agricultural tractor which is one example of four wheel drive working vehicles according to the present invention. The illustrated tractor has a body frame supported by right and left front wheels 1 and right and left rear wheels 2.

Figure 2:
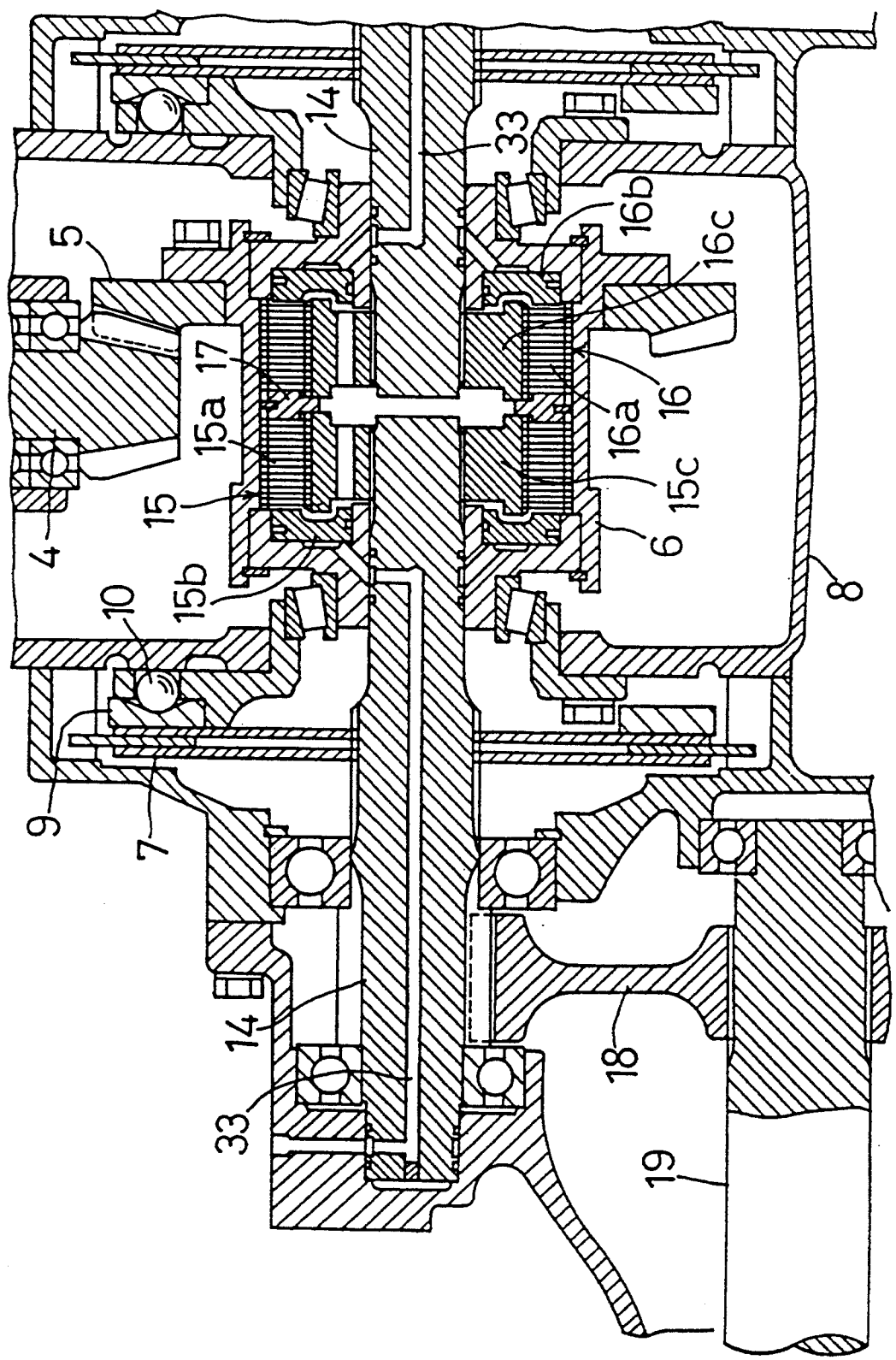
FIG. 2 is a rear view in vertical section showing right and left clutches connected to the rear wheels as well as adjacent components.

As shown in FIGS. 1 and 2, power of an engine 3 is inputted to a gear type transmission 13 for change speed, and then transmitted through an output shaft 4 to a bevel gear 5 for driving the rear wheels 2. The bevel gear 5 is supported on a gear case 6 from which two transmission shafts 14 extend rightward and leftward. Between the gear case 6 and left transmission shaft 14 is a left side clutch 15 including friction plates 15a, a piston 15b and a friction plate carrier 15c. Similarly, between the gear case 6 and right transmission shaft 14 is a right side clutch 16 including friction plates 16a, a piston 16b and a friction plate carrier 16c. Numeral 17 denotes a partition ring mounted between the left and right side clutches 15 and 16.

Each of the side clutches 15 and 16 is engaged by supplying pressure oil for causing the piston 15b or 16b to press the friction plates 15a or 16a. Then power is transmitted to the right and left rear wheels 2 through the bevel gear 5, gear case 6, side clutches 15 and 16, first transmission shafts 14, transmission gears 18 and second transmission shafts 19.

As shown in FIGS. 1 and 2, a braking friction plate 7 is splined to each of the first transmission shafts 14. Between the friction plate 7 and casing 8 are an annular braking element 9 rotatable about the first transmission shaft 14, and cam balls 10 fixed in position. As shown in FIG. 1, a driver's section includes a pair of right and left brake pedals 20 disposed in a righthand region thereof. The brake pedals 20 are mechanically interlocked through wires 11 to the respective braking elements 9.

When, in the position shown in FIG. 2, one of the brake pedals 20 is depressed to rotate the braking element 9 a predetermined angle, the braking element 9 slides leftward in FIG. 2 by action of the cam balls 10. Then the braking element 9 presses the friction plate 7, thereby to brake the first transmission shaft 14.

Figure 3:
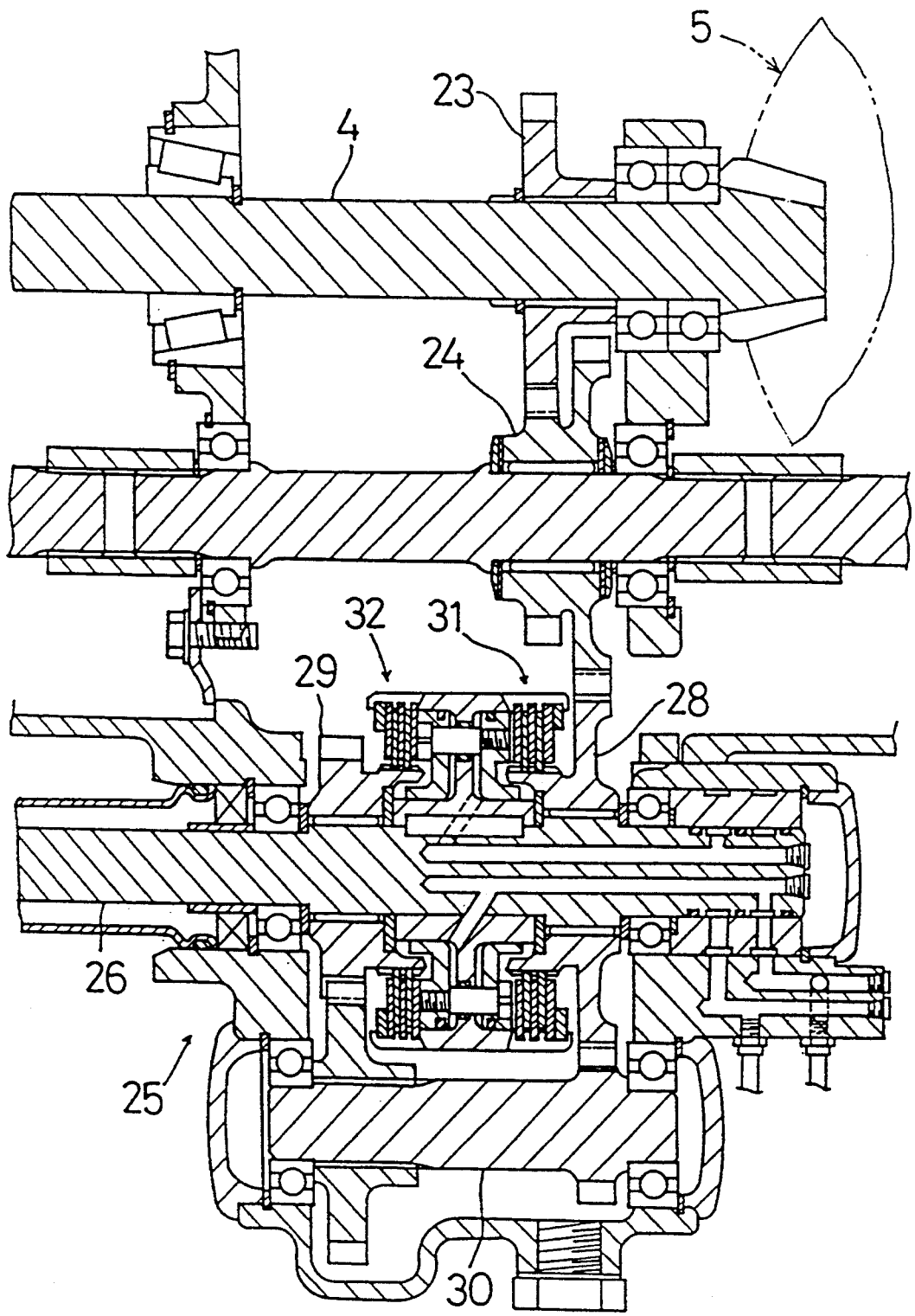
FIG. 3 is a side view in vertical section showing a front wheel speed changer.

A structure for driving the front wheels 1 will be described next. As shown in FIGS. 1 and 3, power is taken from the output shaft 4 and transmitted to the front wheels 1 through transmission gears 23 and 24, a front wheel speed changer 25, a front wheel output shaft 26 and a front differential 27. As shown in FIG. 3, the front wheel speed changer 25 includes a standard gear 28 and an accelerating gear 29 relatively rotatably mounted on the front wheel output shaft 26. Power is transmitted from the transmission gear 24 through the standard gear 28 and a transmission shaft 30 to the accelerating gear 29. A first hydraulic multidisk clutch 31 is disposed between the output shaft 26 and standard gear 28, and a second hydraulic multidisk clutch 32 between the output shaft 26 and accelerating gear 29.

According to this construction, the first clutch 31 is engaged for normal straight running of the tractor, whereby the front wheels 1 are driven at substantially the same speed as the rear wheels 2. When the second clutch 32 is engaged, the front wheels 1 are accelerated to be faster than the rear wheels 2.

The construction and functions of this front wheel speed changer are disclosed in detail in U.S. Pat. Nos. 4,862,988 and 4,723,622.

Figure 4:
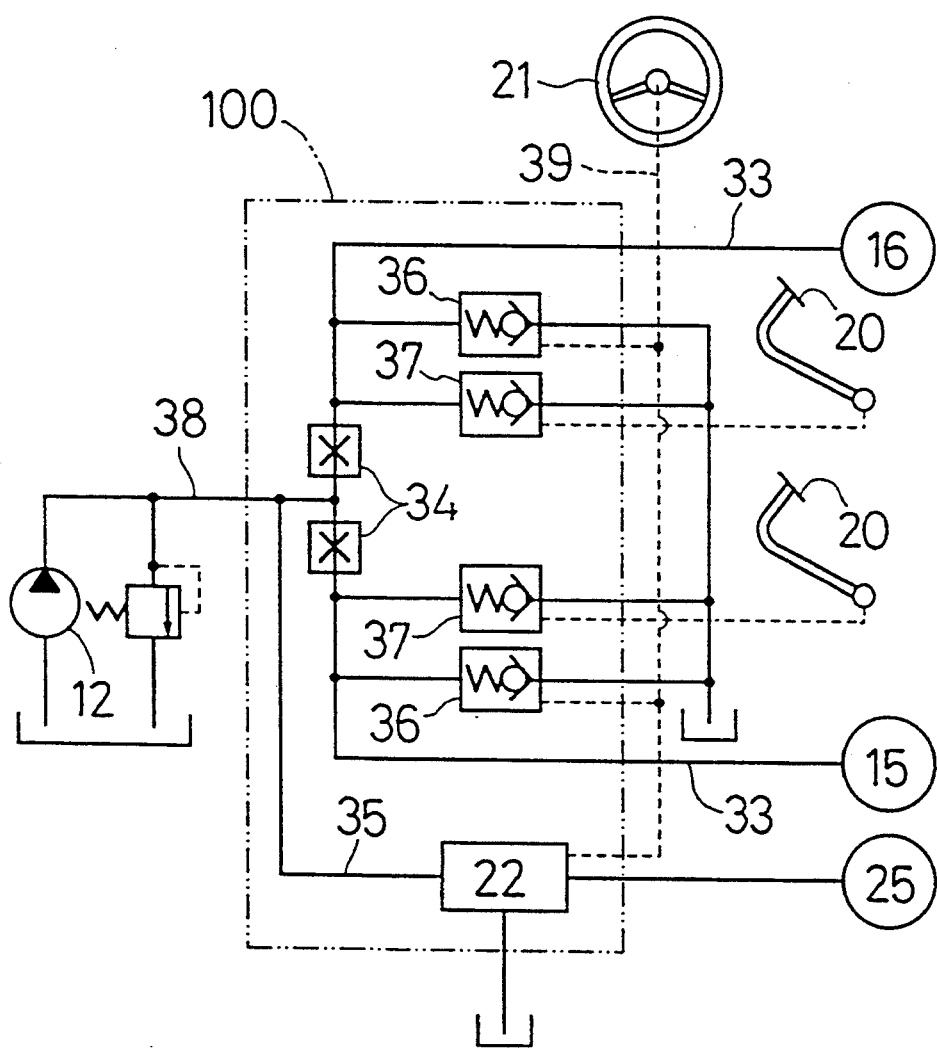
FIG. 4 is a block diagram showing a hydraulic control system linked with the right and left side clutches, clutches of the front wheel speed changer, a steering wheel, and brake pedals.

FIG. 4 schematically shows a control system 100 for controlling the front wheel speed changer 25 and left and right side clutches 15 and 16 in response to operation of a steering wheel 21 for steering the front wheels 1 and to operation of the brake pedals 20. In this embodiment, the control system 100 basically comprises a hydraulic circuit. Specifically, an oil line 38 extending from a pump 12 branches rightward and leftward to a pair of orifices 34. Oil lines 33 (see FIG. 2) extend from the orifices 34 to the left and right side clutches 15 and 16, respectively. An oil line 35 branched from the oil line 38 is connected to a hydraulic unit 22 for controlling the front wheel speed changer 25. A pair of normally closed switch valves 36 and 37 are connected to each of the left and right oil lines 33.

The steering wheel 21 is operatively connected to the respective switch valves 36 and 37 and hydraulic unit 22 through an interlocking device 39. This interlocking device 39 may be a hydraulic or electrical device or a link mechanism known per se.

According to the above construction, when the front wheels 1 are in a straight running position or within a first predetermined angle, e.g. 10 to 20 degrees, leftward or rightward of the straight running position, the first clutch 31 of the front wheel speed changer 25 shown in FIG. 3 is engaged to provide a standard state. Pressure oil is then supplied to the pistons 15b and 16b of the left and right side clutches 15 and 16 (with the switch valves 36 and 37 in FIG. 4 closed) to engage the side clutches 15 and 16. In this state, the left and right rear wheels 2 are driven at the same speed, and the front wheels 1 and rear wheels 2 are driven at substantially the same speed.

Assume that the steering wheel 21 is now turned leftward to steer the front wheels 1 leftward from the straight running position beyond the first predetermined angle. In response to the operation of the steering wheel 21, the left switch valve 36 in FIG. 4 is opened to disengage the left side clutch 15 in FIG. 2, thereby placing the left rear wheel 2 (on the inside of the turn) in free rotation state. Since the front wheel speed changer 25 is maintained in the standard state, the tractor is turned leftward with the left and right front wheels 1 and right rear wheel (on the outside of the turn) driven at substantially the same speed.

Assume that the steering wheel 21 is turned further leftward to steer the front wheels 1 leftward from the straight running position beyond a second predetermined angle, e.g. 40 degrees. In response to this operation, the hydraulic unit 22 switches the front wheel speed changer 25 to an accelerating state with the left switch valve 36 in FIG. 4 opened (the left side clutch 15 in FIG. 2 disengaged). As a result, the right rear wheel 2 (on the outside of the turn) is driven while the left rear wheel 2 (on the inside of the turn) is in free rotation state, and the left and right front wheel 1 are driven faster than the right rear wheel 2. Thus, the tractor smoothly makes a small, sharp leftward turn without marring the ground.

Also when the right or left brake pedal 20 shown in FIGS. 1 and 4 is depressed, the right or left switch valve 37 is opened to disengage the right or left side clutch 16 or 15.

The above embodiment includes the front wheel speed changer 25. However, it is possible within the scope of this invention to construct a tractor without the front wheel speed changer 25.

What is claimed is:

1. A four wheel drive working vehicle comprising:
    an engine;
    front wheels and rear wheels;
    front wheel steering means for steering said front wheels;
    a front differential connected to said front wheels;
    change speed means for changing speed of power received from said engine, and transmitting the power to said front differential and to said rear wheels;
    a first clutch for controlling power transmission from said change speed means to a righthand one of said rear wheels;
    a second clutch for controlling power transmission from said change speed means to a lefthand one of said rear wheels; and
    clutch control means for controlling said first and second clutches, said clutch control means being interlocked to said front wheel steering means to disengage one of said first and second clutches corresponding to one of said rear wheels lying on the inside of a turn when said front wheels are steered in excess of a first predetermined angle, wherein said rear wheel lying on the inside of the turn is placed in a nondriven, free rotation state by the disengagement of said corresponding clutch, wherein said change speed means includes a front wheel speed changer for selectively producing a first mode to drive said front wheels and said rear wheels at substantially the same speed, and a second mode to drive said front wheels faster than said rear wheels, and front wheel speed control means for switching said front wheel speed changer from said first mode to said second mode when said front wheels are steered in excess of a second predetermined angle.

2. A four wheel drive working vehicle as claimed in claim 1, wherein said first predetermined angle is 10 to 20 degrees, and said second predetermined angle is about 40 degrees.

3. A four wheel drive working vehicle as claimed in claim 1, wherein said front wheel speed changer is operable in said second mode to drive said front wheels approximately twice as fast as said rear wheels.

4. A four wheel drive working vehicle as claimed in claim 1, wherein said first predetermined angle is less than said second predetermined angle.

5. A four wheel drive working vehicle comprising:
    an engine;
    front wheels and rear wheels;
    front wheel steering means for steering said front wheels;
    a front differential connected to said front wheels;
    change speed means for changing speed of power received from said engine, and transmitting the power to said front differential and to said rear wheels;
    a first clutch for controlling power transmission from said change speed means to a righthand one of said rear wheels;
    a second clutch for controlling power transmission from said change speed means to a lefthand one of said rear wheels; and
    clutch control means for controlling said first and second clutches, said clutch control means being interlocked to said front wheel steering means to disengage one of said first and second clutches corresponding to one of said rear wheels lying on the inside of a turn when said front wheels are steered in excess of a first predetermined angle of about 10 to 20 degrees thereby placing said rear wheel lying on the inside of said turn in a nondriven, free rotation state;
    wherein said change speed means includes a front wheel speed changer for selectively producing a first mode to drive said front wheels and said rear wheels at substantially the same speed, and a second mode to drive said front wheels approximately twice as fast as said rear wheels, and front wheel speed control means for switching said front wheel speed changer from said first mode to said second mode when said front wheels are steered in excess of a second predetermined angle of approximately 40 degrees.

* * * * *